Figure 5:
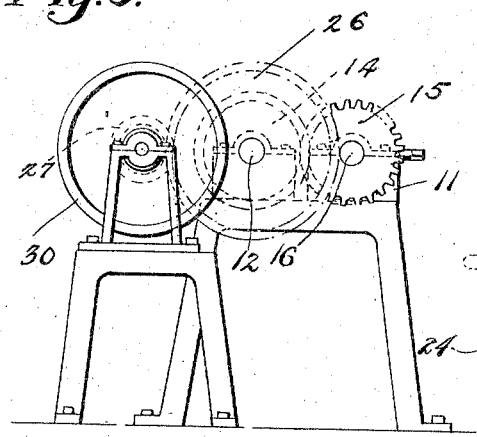

J. O. BLACKWELL.
SAW ROLLING MACHINE.
APPLICATION FILED MAR. 21, 1918.
1,290,491.
Patented Jan. 7, 1919.
3 SHEETS—SHEET 1.
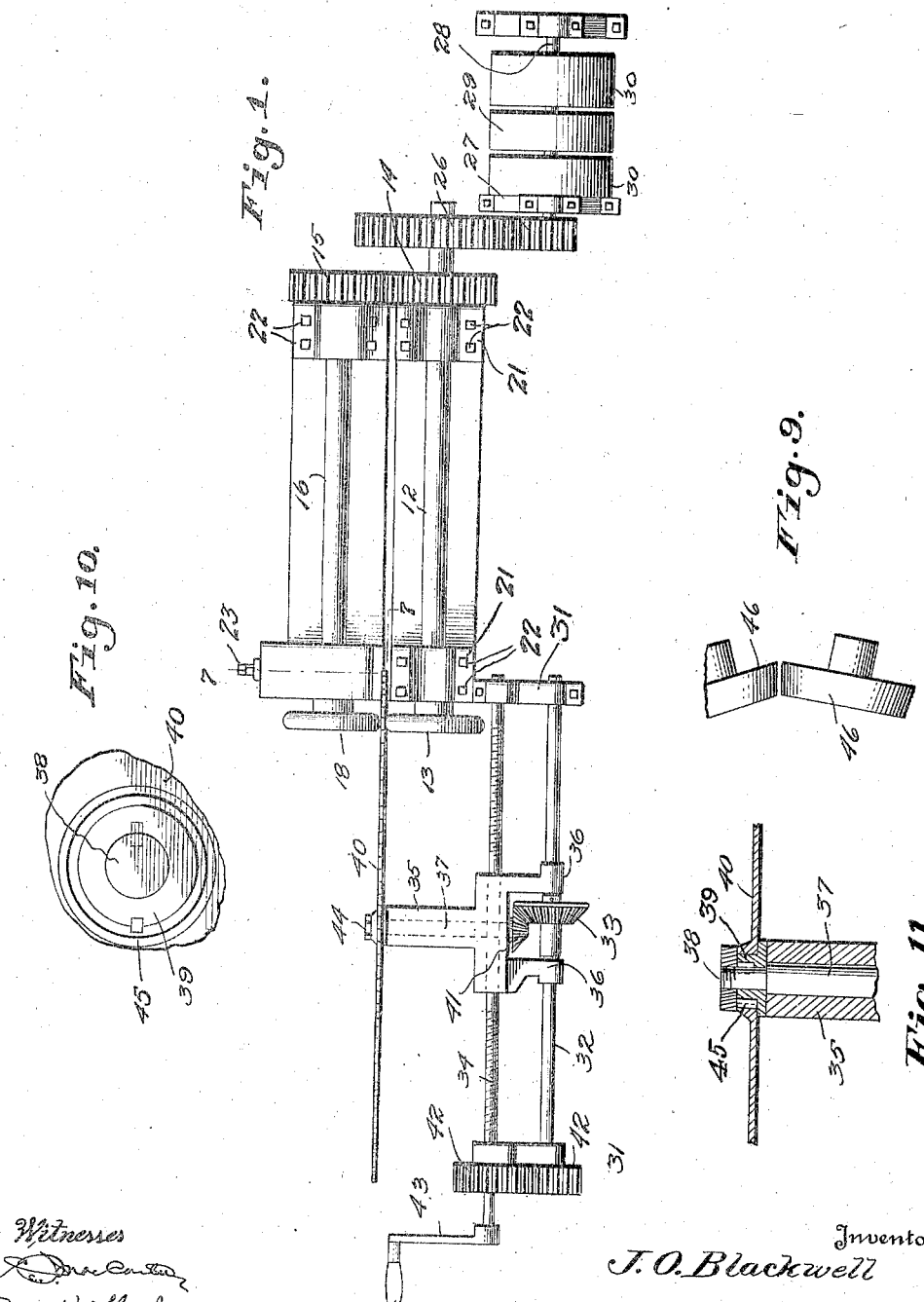
Witnesses
Inventor
J. O. Blackwell
By R. Morgan Elliott & Co.
Attorneys J. O. BLACKWELL.
SAW ROLLING MACHINE.
APPLICATION FILED MAR. 21, 1918.
1,290,491.
Patented Jan. 7, 1919.
3 SHEETS—SHEET 2.
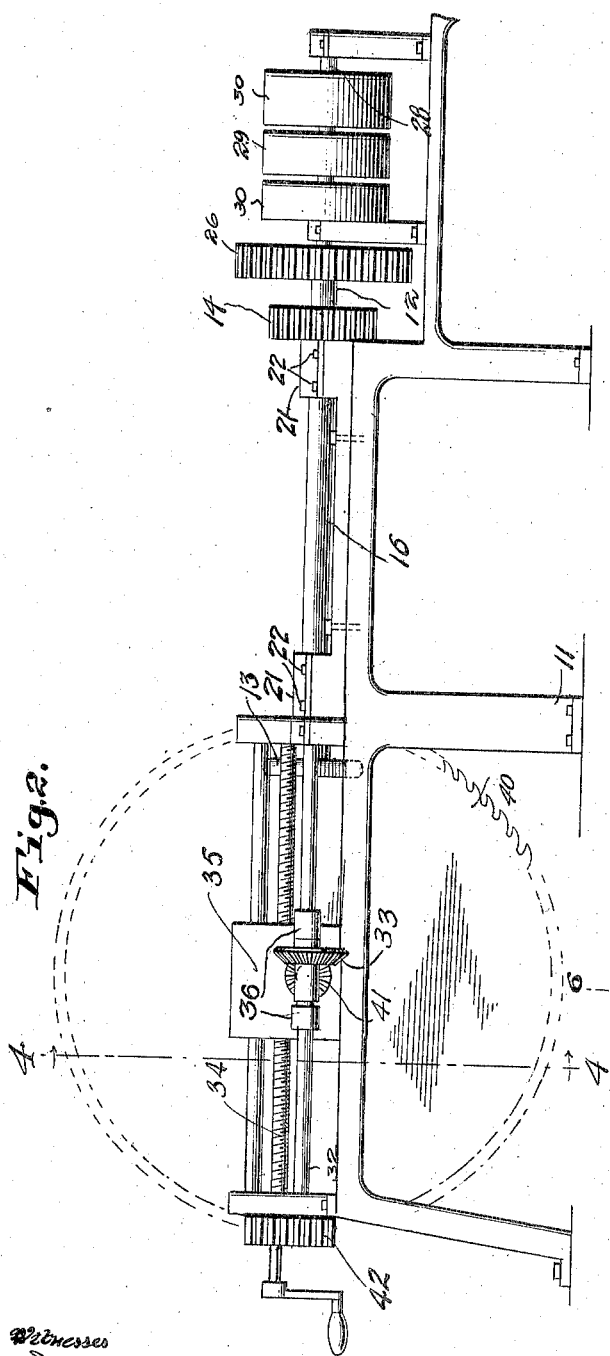
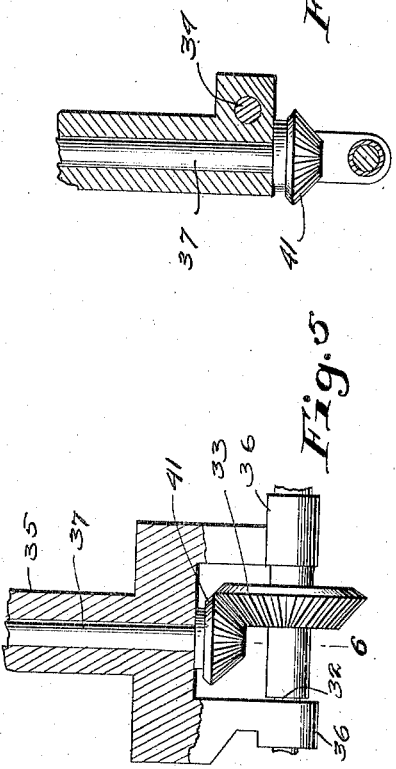
Inventor
J. O. Blackwell
By R. Morgan Elliott & Co.
Attorneys

J. O. BLACKWELL.
SAW ROLLING MACHINE.
APPLICATION FILED MAR. 21, 1918.

1,290,491.

Patented Jan. 7, 1919.
3 SHEETS—SHEET 3.

Witnesses

Inventor
J. O. Blackwell
By R. Morgan Elliott & Co.
Attorney

UNITED STATES PATENT OFFICE.

JOHN O. BLACKWELL, OF FORDYCE, ARKANSAS.

SAW-ROLLING MACHINE.

1,290,491.            Specification of Letters Patent.       Patented Jan. 7, 1919.

Application filed March 21, 1918.   Serial No. 223,785.

*To all whom it may concern:*

Be it known that I, JOHN O. BLACKWELL, a citizen of the United States, residing at Fordyce, in the county of Dallas and State of Arkansas, have invented certain new and useful Improvements in Saw-Rolling Machines, of which the following is a specification.

This invention relates to the manufacture of saws and has special reference to a saw stretching and tensioning machine.

In the course of the manufacture of saws for saw-mill purposes it is a well known fact that annealing and tempering processes in the construction of circular saws set up strains in the body of the saw that are unequal at different places and that thus there is not only danger of fracture due to such unequal strains but a very considerable amount of warping and buckling takes place so that the saw is warped out of its proper shape. This is true not only in circular saws but also in band saws.

In the case of circular saws this inequality of tension and variation from true shape has been overcome in one instance and corrected in the other by means of hammering at the proper points to produce such correction. In the case of band saws it is common to roll such saws between a pair of rollers pressed one toward the other.

The object of the present invention is to provide a new and improved machine wherein circular saws may be rolled in a manner analogous to the present method of rolling band saws.

Another feature of the machine is the provision of means in the construction whereby the saw itself will constitute, while being rolled, one of the friction gears of a gear train so arranged that the action of the rollers may be gradually shifted between the eye and the periphery of the saw automatically.

In carrying out the objects of this invention, and with the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a plan view of a saw rolling machine constructed in accordance with this invention.

Figure 7:
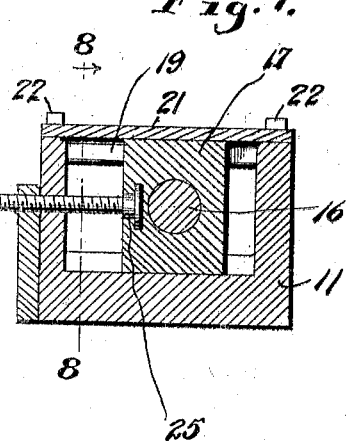
Figure 4:
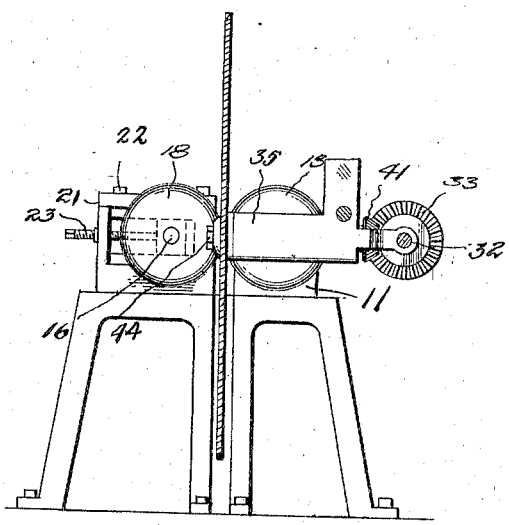
Figure 8:
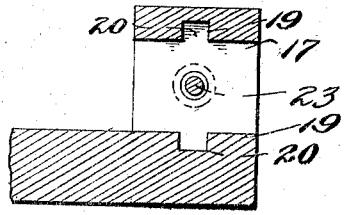

Fig. 2 is a side elevation thereof.
Fig. 3 is an end view thereof.
Fig. 4 is a section on the line 4—4 of Fig. 2.
Fig. 5 is an enlarged detail view of a portion of the drive gearing for the feed.
Fig. 6 is a section on the line 6—6 of Fig. 5.
Fig. 7 is a detail section on the line 7—7 of Fig. 1.
Fig. 8 is a section on the line 8—8 of Fig. 7.
Fig. 9 is a detail view showing a modification of the roller arrangement.
Fig. 10 is a detail view showing a portion of a saw and bushing fitted on the saw supporting spindle.
Fig. 11 is a fragmentary transverse sectional view through the saw and its supporting shaft.

In carrying out the objects of this invention in the form herein set forth there is provided a suitable frame which includes the bearing standards 11. Fixedly journaled in these standards is a shaft 12 which carries on one end a roller 13 and is provided on its other end with a gear 14 which meshes with a gear 15 fixed on a shaft 16 supported in bearing blocks 17. This shaft is also provided with a roller 18 coacting with the roller 13. The upper parts of the standards 11 are slotted to receive the bearings 17 and in the inner sides of these slots are provided grooves 19 wherein suitable tongues 20 located on the bearing blocks 17 are operative. On the side of each of the members 11 is a cap 21 which is held in position by screws or bolts 22. Extending through the cap 21 is an adjusting screw 23 provided with a hand wheel 24 on its outer end and carrying on its inner end a swivel head 25 fitting in a suitable socket in the respective block 17. Now by means of the adjusting screws 23 the roller 18 may be moved with respect to the roller 13 so as to accommodate the different thicknesses of saw between the two rollers and also to permit the required pressure.

In addition to the gear 14 the shaft 12 has fixed thereon a gear 26 wherewith meshes a gear 27 fixed on a shaft 28 provided with a fast pulley 29, and loose pulleys 30 so that the machine may be driven by means of suitable belts, one of the belts being preferably crossed for purposes of reversing.

A standard 31 is formed on and extends laterally from one of the front standards 11 and this standard has journaled therein a shaft 32 on which is splined a beveled gear 33. Journaled in the bearing standards above and a little to one side of the shaft 32 is a screw-threaded shaft 34 and on the shafts 32 and 34 is supported a carriage 35, the shaft 34 passing through a threaded hole in said carriage and the carriage being provided with forwardly extending arms 36 which embrace the gear 33 and slide on the shaft 32. Thus by rotation of the screw 34 the carriage can be caused to travel backward and forward toward the rollers 13 and 18. Extending vertically through this carriage is a shaft 37 which has its upper end reduced as at 38 so as to receive a bushing 39 which is one of an interchangeable series of various diameters to fit the eyes of the different saws, one of which is indicated at 40. On the lower end of the shaft 37 is fixed a bevel gear 41 which constantly meshes with the gear 33. On the shaft 32 and screw 34 are fixed gears 42 which mesh each with the other so that the revolution of the shaft 32 will cause revolution of the screw 34. In addition to this a suitable crank handle 43 is provided on the threaded shaft or screw 34 so that the latter may be turned by hand when desired. Now in the operation of rolling a circular saw it is mounted on the spindle 37 and there secured by means of a nut 44. The periphery of the saw is brought between the rollers 13 and 18 and the rollers 18 are adjusted to give the desired pressure. Supposing it be desired to roll the saw throughout its extent from the periphery inward, it is then merely necessary to start the machine by shifting the proper belt from a loose pulley 30 to the pulley 29. This through the gears 27, 26, 14 and 15 will drive the rollers 18 and 13 which, clamping the saw between them, will cause the saw to rotate as it is rolled. In other words the rollers and saw form elements of a friction gearing. Now since the bushing 39 is keyed to the saw and to the spindle 38 by keys 45, rotation of the saw will rotate the shaft 32. This in turn through the gears 42 will rotate the screw 34 and cause the carriage 35 to travel toward the rollers 18 and 13. Thus the saw will move between said rollers so that all portions from its periphery to its eye will be acted on by the rollers. In the event that it is desired to roll only a small area of the saw this may be effected by proper manipulation of the belts so that the rollers are run first in one direction and then in the other. If, after a complete treatment of the saw it is desired to release said saw from further treatment it is merely necessary to raise the roller 18 by manipulation of the wheels 24 and then withdraw the carriage 35 by manipulation of the crank handle 43.

While Figs. 1, 2 and 4 disclose rollers having rounded edges yet in some instances it may be advisable to use cone-shaped rollers as indicated at 46 in Fig. 9. It will be obvious that such cone-shaped rollers will require slight changes in the arrangement of the gearing, bevel gears being substituted for the gears 14 and 15. It is not deemed necessary to illustrate these changes as the same are common in the art where it is wished to drive shafts which are not parallel.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a machine of the class described, a saw roller arranged to engage and drive a saw, a saw supporting spindle arranged to receive the saw in fixed relation thereto, a feeding mechanism driven from said spindle, and means to drive the roller.

2. In a machine of the class described; a plurality of saw rollers arranged to clasp and drive a saw, means to forcibly move one of said rollers toward the other, means to drive said rollers, a saw supporting spindle arranged to receive and fixedly hold the saw, and movable to and from the rollers, and a feed mechanism for effecting movement of and driven from the spindle.

3. In a machine of the class described; a plurality of saw rollers arranged to clasp and drive a saw, means to forcibly move one of said rollers toward the other, means to drive said rollers, a saw supporting spindle arranged to receive and fixedly hold the saw, a carriage movable to and from the rollers and supporting the spindle, a feed screw screwed through said carriage and supported against longitudinal movement, and gearing connecting the feed screw and spindle.

4. In a machine of the class described; a plurality of saw rollers arranged to clasp and drive a saw, means to forcibly move one of said rollers toward the other, means to drive said rollers, a saw supporting spindle arranged to receive and fixedly hold the saw, a carriage movable to and from the rollers and supporting the spindle, a feed screw screwed through said carriage, a rotatable guide shaft on which said carriage travels, gears connecting the spindle and guide shaft, and other gears connecting the guide shaft and screw.

5. In a machine of the class described, a saw roller arranged to engage and drive a saw, means to drive the roller, a support to revolubly carry the saw, and a feeding mechanism actuated by the revolving saw to move the support relatively to the roller.

6. In a machine of the class described, a support, a roller carried by said support, a second support, a saw rotatably carried by said second support and adapted for engagement with the roller, a feeding means to carry the saw toward said roller and means to operate the feeding means when the saw revolves.

In testimony whereof I affix my signature.

JOHN O. BLACKWELL.

Witnesses:
W. J. SANDERS,
R. L. HORNADAY.

Copies of this patent may be obtained for five cents each, by addressing the "Commissioner of Patents, Washington, D. C."